United States Patent [19]

Demers et al.

[11] Patent Number: 5,278,978
[45] Date of Patent: Jan. 11, 1994

[54] METHOD AND SYSTEM FOR DESCRIBING AND EXCHANGING DATA BETWEEN HETEROGENEOUS DATABASE SYSTEMS WITH DATA CONVERTED BY THE RECEIVING DATABASE SYSTEM

[75] Inventors: Richard A. Demers, Rochester, Minn.; Bruce G. Lindsay, San Jose, Calif.; Roger A. Reinsch, Cupertino, Calif.; Melvin R. Zimowski, San Jose, Calif.

[73] Assignee: International Business Machines Corporation, Armonk, N.Y.

[21] Appl. No.: 499,114

[22] Filed: Mar. 26, 1990

[51] Int. Cl.⁵ ............................................. G06F 12/06
[52] U.S. Cl. ..................... 395/600; 364/DIG. 1; 364/282.1; 364/239.3; 364/260 R
[58] Field of Search ................ 395/600, 725, 200, 650

[56] References Cited

U.S. PATENT DOCUMENTS

| 4,141,005 | 2/1979 | Bonner et al. | 340/347 DD |
|---|---|---|---|
| 4,386,416 | 5/1983 | Giltner et al. | 364/900 |
| 4,430,699 | 12/1984 | Segerra et al. | 364/200 |
| 4,476,528 | 10/1984 | Matsumoto et al. | 364/200 |
| 4,480,306 | 10/1984 | Bachman et al. | 364/200 |
| 4,559,614 | 12/1985 | Peek et al. | 364/900 |
| 4,633,466 | 12/1986 | Laws et al. | 371/16 |
| 4,672,570 | 6/1987 | Benken | 364/900 |
| 4,714,995 | 12/1987 | Materma et al. | 364/200 |
| 4,786,763 | 11/1988 | Schumacher | 178/2 R |
| 4,800,488 | 1/1989 | Agrawal et al. | 395/800 |
| 4,870,611 | 9/1989 | Martin et al. | 395/147 |
| 4,908,759 | 3/1990 | Alexander, Jr. et al. | 364/200 |
| 4,979,109 | 12/1990 | Tanaka et al. | 364/200 |
| 5,047,923 | 9/1991 | Elstner et al. | 395/325 |
| 5,058,000 | 10/1991 | Cox et al. | 364/200 |
| 5,187,787 | 2/1993 | Skeen et al. | 395/600 |

FOREIGN PATENT DOCUMENTS

1602675 11/1981 United Kingdom .

OTHER PUBLICATIONS

Yamamoto, Masahiro—Translated Summary of Japanese Published Application No. 54-93942, "High-Level Language Program Executing Unit", Jul. 25, 1979.
Suzuki, Takafumi et al.—Translated Summary of Japanese Published Application No. 60-112145, "Control System of Data", Jun. 18, 1985.
Oka, Hiroshi—Translated Summary of Japanese Published Application No. 63-196957, "Data Base Control System" Aug. 15, 1988.
"Data Access Architecture," IBM TDB, vol. 31 No. 5, Oct. 1988, pp. 30–33.

*Primary Examiner*—Lawrence E. Anderson
*Assistant Examiner*—Mehmet Geckil
*Attorney, Agent, or Firm*—Baker, Maxham, Jester & Meador

[57] ABSTRACT

The invention establishes the context in which data exchanged between dissimilar relational database management systems can be mutually understood and preserved. The invention accomplishes this by establishing layers of descriptive information which isolate machine characteristics, levels of support software, and user data descriptions. Optimized processing is achieved by processing the different descriptor levels at different times during the development and execution of the database management systems. Minimal descriptive information is exchanged between the cooperating database management systems. For systems which match, data conversion is completely avoided. For systems which do not match, data conversion is minimized.

2 Claims, 6 Drawing Sheets

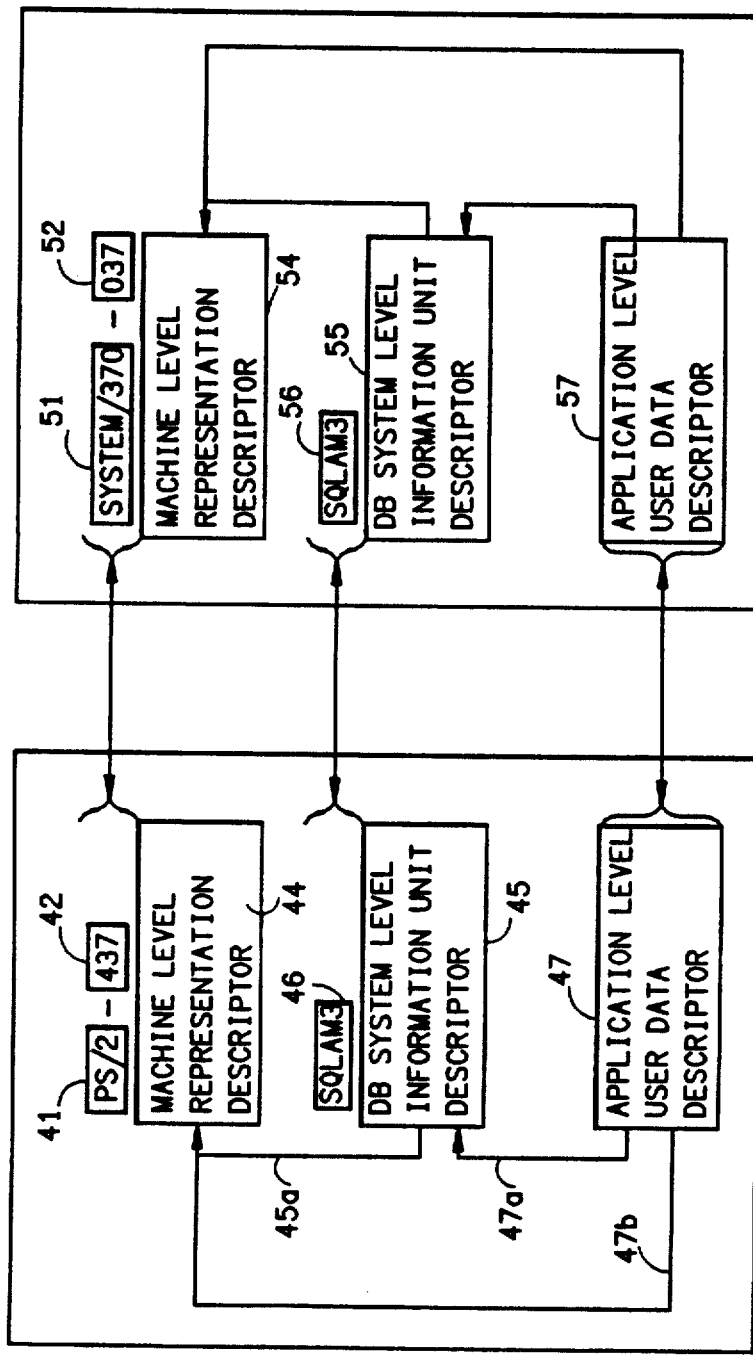

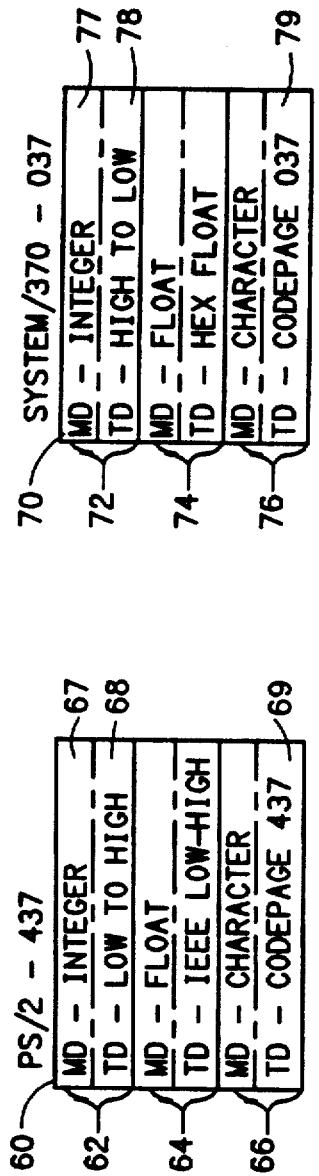
FIG. 2a
FIG. 2b
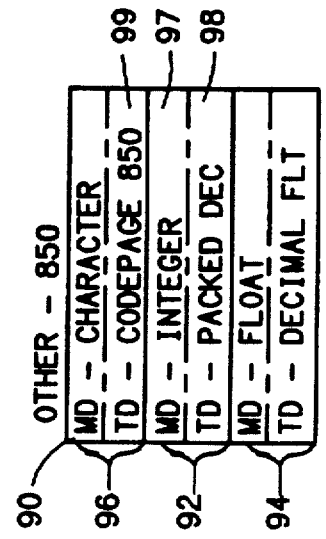
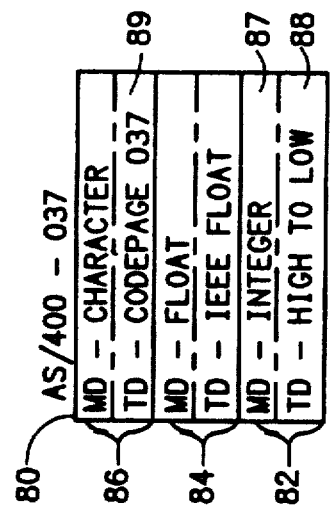
FIG. 2c
FIG. 2d

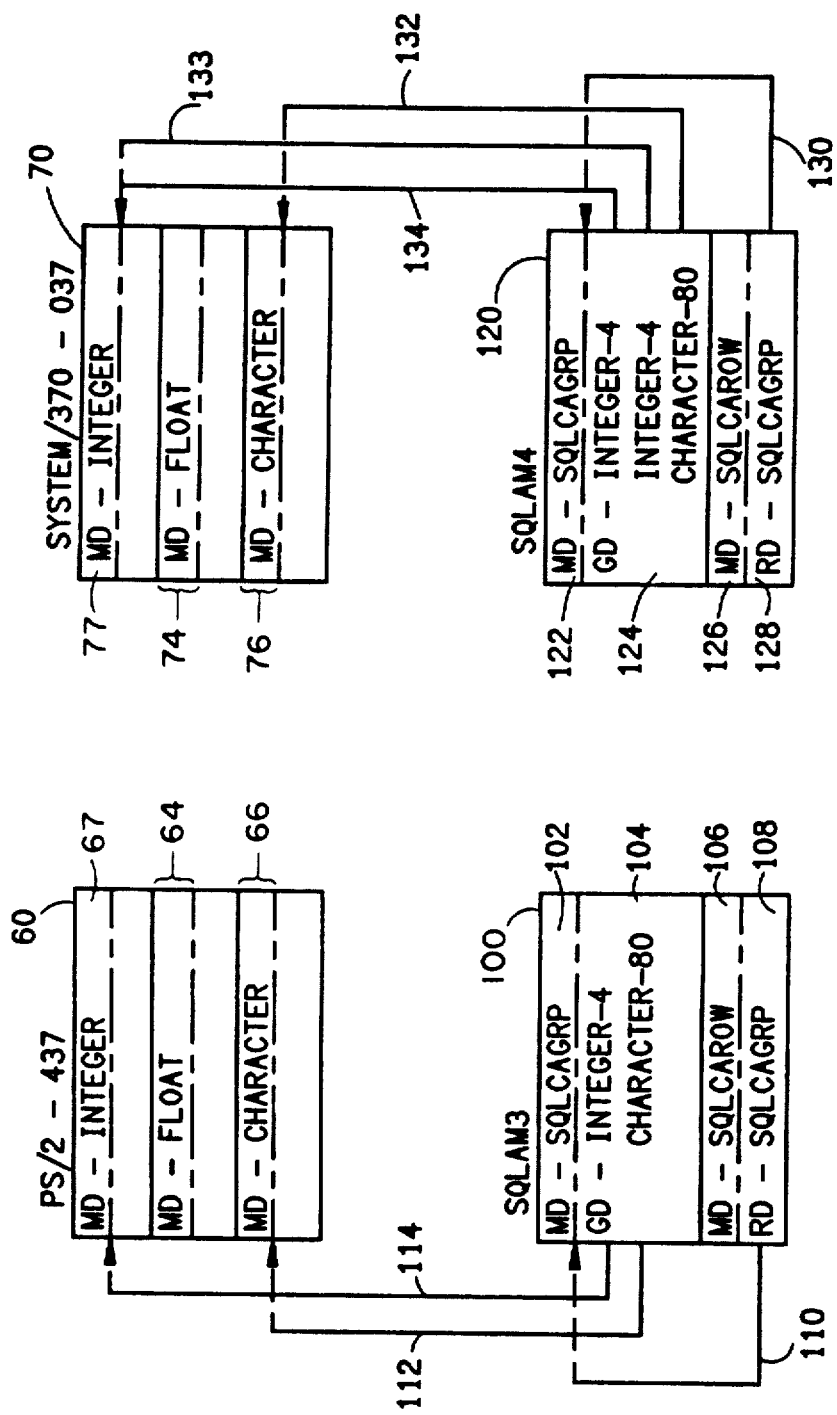

METHOD AND SYSTEM FOR DESCRIBING AND EXCHANGING DATA BETWEEN HETEROGENEOUS DATABASE SYSTEMS WITH DATA CONVERTED BY THE RECEIVING DATABASE SYSTEM

CROSS REFERENCE TO PENDING APPLICATIONS

This application includes material which overlaps material in pending U.S. patent application Ser. No. 07/500,031, filed Mar. 27, 1990, entitled "METHOD FOR CONVERTING DATA TRANSFERRED BETWEEN HETEROGENEOUS DATABASE SYSTEMS", inventors: John G. Adair, et al.; and U.S. patent application Ser. No. 07/500,032, filed Mar. 27, 1990, entitled "QUERY LANGUAGE EXECUTION ON HETEROGENEOUS DATABASE SERVERS", inventors: John G. Adair, et al.

BACKGROUND OF THE INVENTION

1. Technical Field

This invention relates to the characterization of data for interprocess exchange. More particularly, the invention relates to establishing the context in which data exchanged between dissimilar (heterogeneous) relational database management systems can be mutually understood and preserved.

2. Description of the Prior Art

Currently there is great interest in joining together multiple database management sites to form a distributed system which provides any user at any site with access to data stored at any other site; see for example, AN INTRODUCTION TO DATABASE SYSTEMS, Vol. 1, by C. J. Date (4th Edition, 1986), at pp. 587-622. Date envisions that each site would constitute an entire database system with its own database management system (DBMS), terminal, users, storage, and CPU.

In a distributed database system such as the type described by Date, the DBMS at any site may operate on a machine type which is different than the machine type of another site. Indeed, there may be as many different machine types as sites. For example, the IBM Corporation (Assignee of this patent application) has DBMSs which operate on System/370 machines, AS/400 machines, and PS/2 machines.

The machines upon which the DBMSs of a heterogeneous database system run all represent information in different internal formats. For example numeric information on PS/2 machines is stored with the bytes in low order to high order sequence. On other machines, such information may be stored in high order to low order sequence. For floating point information, there are IEEE floating point machines and hexadecimal floating point machines. Character information is processed in many different code representations, the choice of which reflects historical or cultural roots.

As DBMSs grow and evolve over time, they may be embodied in a series of versions or releases. Each of these may require additional information to be exchanged in a distributed database system. When these changes are introduced, all sites must be informed.

When a database program is written, compiled and executed entirely in one environment (machine and DBMS), it rarely is sensitive to the exact representation of the data which it processes. The data compiled into the program and the data stored in database structures are all represented identically so the operations behave as expected. Thus, a COMPARE command executed in a single database environment can always be made to manipulate data correctly, just by using the high level language operations of the system.

Thus, given disparity in machine types and the ever-evolving nature of DBMSs, it is inevitable that a distributed database system can be heterogeneous in the sense that any site may manage a database by means of a combination of machine and DBMS which is different from the combination at another site.

Provision is made in the prior art for solving the problems of machine and system incompatibility in a distributed, heterogeneous database system. Three solutions are of interest.

The earliest solution may be termed "application beware". This solution usually starts as a connection between identical database systems which grows over time to incorporate some machines which differ slightly from the original. In these solutions, there is no way for the system to automatically handle the differences, with the result that the application program was given this responsibility. If access to heterogeneous databases was needed badly enough, the application was written to make any necessary accommodations.

The second solution utilizes a canonical representation of data. This approach calls for conversion of data into a single, generic (canonical) representation before transport from one database site to another. Superficially, this solves the problem of automating the system to handle differences between differing databases. However, this approach requires many extra conversions which are inefficient, and introduces many conversion errors, making the approach inaccurate. For example, conversion of a floating point number always requires rounding off, with a concomitant loss of accuracy. When converting from one to another floating point representation, say, from IEEE to hexadecimal, precision is lost. In changing from hexadecimal to IEEE, scale is lost. Where character translations are performed, many of the special characters are lost because of lack of equivalence between character codes. In this solution, conversion errors which do occur are introduced at a point in the process far removed from the application. This increase the difficuly of identifying and responding to errors.

The last solution employs a gateway conversion in which a central facility is responsible for matching any database representation to any other. Ideally this reduces the inefficiency, inaccuracy, and error propensity of the canonical representation since conversions can be avoided when they aren't needed. However, inter-site communication is lengthy, slow, and expensive. The gateway is a single node to which all inter-site paths connect for all interactions. Instead of a request and response between the two participating sites, there are two requests and two response for every data transfer. When conversions are required, they are still done in a part of the distributed system which is remote from the application.

Thus, there is an evident need in distributed, heterogeneous database systems to support effective and accurate exchange of data, while reducing the number of conversions, and the communications overhead. It is also desirable to perform any needed conversion at the site where the request for the data to be converted was generated.

SUMMARY OF THE INVENTION

This invention describes a method and system for establishing the context in which data exchanged between heterogeneous relational DBMSs can be mutually understood and preserved. Particularly, a sequence of information transfer is described which enables a database to request or receive data expressed in a non-native form. Thus, with the practice of this invention, a DBMS may receive data in a foreign format and itself perform the necessary conversion of the data.

According to the invention, a database in a distributed, heterogeneous database system contains predefined descriptions of all machine environments in the system (machine descriptors) and predefined descriptions of database language structures (system descriptors) for each DBMS with which it can perform data exchange. When a database operation begins which requires two heterogeneous databases to conduct an information exchange, a communication link is established between them. Next, each DBMS identifies its machine and system descriptors to the other. This establishes a data context and is done only once for the life of the communication link. Once established, requests can be sent and data received. When data is sent to the receiving DBMS, specific descriptions of the data precede the data itself and refer to the machine and system descriptors earlier identified. When the data is received, information contained in the specific descriptions enables a conversion process at the receiver to interpret the data by referencing machine and system descriptors. Taken together, the specific descriptions, and the machine and system descriptors which they reference, precisely characterize the environment where the data originated and establish, at the receiver, a context for predictable conversion of the data into a format which is native to the machine/system combination of the receiving site.

The invention reduces the total overhead required in making and responding to a data request, and attenuates the processing required by the receiver DBMS to interpret the sent data, while increasing the speed with which a request for data is serviced.

BRIEF DESCRIPTION OF THE DRAWINGS

FIG. 1A is an illustration of user data which is to be transferred between non-equivalent database systems.

FIG. 1B is a top level representation of the relationships of all descriptors which define the environmental context of the user data illustrated in FIG. 1A.

FIGS. 2A, 2B, 2C and 2D illustrate machine descriptors.

FIGS. 3A and 3B illustrate system descriptors together with their references to machine descriptors.

DESCRIPTION OF THE PREFERRED EMBODIMENT

Figures 4A, 4B:
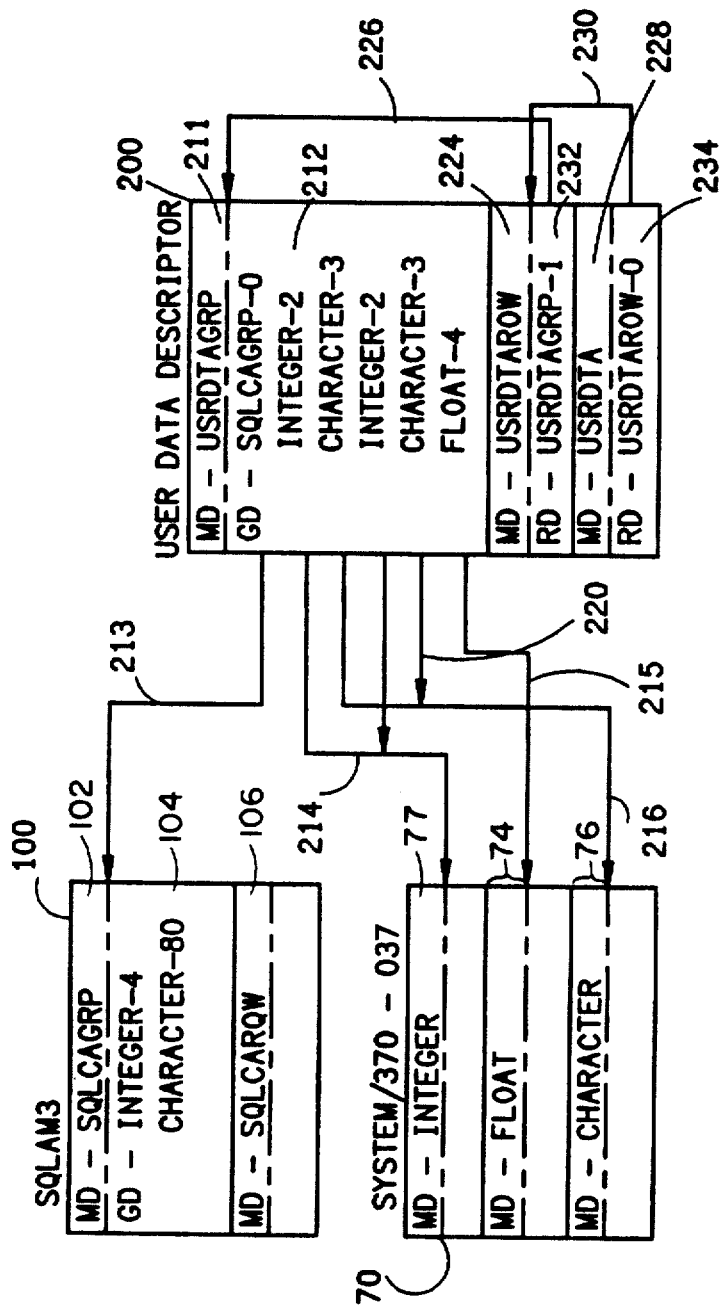
FIGS. 4A and 4B illustrate user data descriptors of the invention with references to machine and system descriptors.

When used herein, the term "descriptor" means a unit of data used to characterize or categorize information. The term "data object" is taken to mean a data structure element that is necessary for the execution of a program and that is named or otherwise specified by a program. A "reference" is a construct such as a pointer which designates a declared object. Descriptors, data objects, and references are all understood in the context of a programming language. In relational DBMSs, a well-known relational language is SQL.

An "environmental context" is an information set which describes the database system which originates a block of user data. Data is in "native form" if it is made up of data types and control information in a form used by the database system which is processing it; otherwise, it is "non-native" or "foreign". A database system "environment" is the set of logical and physical resources used to support database management.

For relational database systems, the SQL language describes several different data types. These types include INTEGER, FLOAT, VARCHAR, and many more. Depending on the machine on which an SQL database manager is implemented, the actual bit representations for data values having SQL data types vary. For example, to represent a floating point number, the IBM System/370 employs a hexadecimal floating point representation, the IBM AS/400 employs the IEEE format, and on IBM's OS/2 machines, IEEE byte reversed formats are used. These differences are implied by the machine environment and are not formally exposed to application programs executing in the environments.

Furthermore, there are many SQL identified standard control blocks, such as the SQL communication area (SQLCA) which is defined in terms of SQL types. The SQLCAs in the machine environments defined above are not identical. This invention formalizes a method and means for exchanging information between heterogeneous DBMSs about machine characteristics and DBMS language structures such that little or no descriptive information must flow during the exchange of data in order to convert data to a native form. Additionally, when database sites match, no conversions are performed at all, thus preserving completely the integrity of the data being exchanged. When these sites do not match, data conversions are performed close to the ultimate point of use where errors introduced by imperfect conversions can be dealt with according to the needs of the requesting application.

This invention is described using simple machines, database management systems, and user data. Those skilled in the art will understand that detailed implementations will require support for many more generic data types than are described hereinbelow, many more DBMS information blocks, and user data with many more fields. The extensions to handle these cases are manifest and would only serve to unnecessarily obscure the invention if presented herein.

FIG. 1A illustrates user data in hexadecimal format. The data are shown in two forms, 10 and 20. The user data 10 appears as it would in a typical personal computer environment. The data 20 has the same meaning as the data 10 except that it appears in the form it would have in a typical mainframe environment.

The user data forms illustrated in FIG. 1A form the example upon which explanation of the invention is based. When the user data is to be sent from the personal computer environment to the mainframe environment as illustrated by the direction 31-30, it must be changed in form from 10 to 20. Conversely, if the user data is to be sent from the mainframe to the personal computer environment, that is, direction 30–31, it must be changed in form from 20 to 10.

The actual data being transferred consists of three rows. Each row is an entity containing all of the fields necessary to describe the outcome of an SQL statement. With reference to the rows in each user data, the first fields 11 and 21 are SQL communication areas which described the outcome of an SQL statement. In this regard the SQL statement is assumed to be a command in the SQL language which results in the manipulation of data in a database. In the example, the data affected by the outcome of the SQL statement consists of five fields. In the first row, the first fields 12 and 22 contain the integer value 100, the second fields 13 and 23 contain the character value "ABC", the third fields 14 and 24 contain the integer value 80, the fourth fields 15 and 25 hold the character value "ZYX", and the last fields 16 and 26 contain the floating point value 12.3.

The second row of each representation in FIG. 1A consists of an SQL communication area followed by the integer value 200, "DEF", the integer value 160, the characters "WVU", and the floating point value 45.6. Similarly, the third row includes an SQL communication area, integer 300, characters "GHI", integer 240, characters "TSR", and floating point 78.9.

It will be appreciated that the integers in the user data 10 are in low to high sequence, and in high to low sequence in the user data 20. Characters are coded in ASCII in the personal computer user data and in EBCDIC in the mainframe user data. Floating point is IEEE low to high in fields 16 of the user data and hexadecimal excess-64 in fields 26 of the user data 20. The communication areas 11 in the personal computer machine use formats which are different than the SQL communication areas 21 in the mainframe environment.

No distinction has yet been made as to which direction the data in FIG. 1A will be transferred. That is, no statement has been made as to which environment is the server and which the receiver of data. The method of this invention is completely symmetric and reversible. However, for the purpose of explanation, assume that a request for data is made by a personal computer DBMS, that the receiver will receive data and that a mainframe DBMS receives the request and sends the data. Relatedly, in FIG. 1A, the requested data is user data 20 which must be rendered ultimately into the form represented by user data 10. The invention provides for establishing a context by which the receiver can accept user data 20 and prepare for conversion of that data into the format represented by user data 10. This invention does not concern the actual conversion process itself, but rather with a method and means for enabling the receiver machine environment to be ready to perform the conversion.

In FIG. 1B, there is illustrated a personal computer machine environment 40 ("receiver") and a mainframe machine environment 50 ("server"). The personal computer environment can include, for example, the IBM PS/2 product programmed with an OS/2 SQL-based database management system. For convenience, the machine name of the personal computer 40 is indicated by reference numeral 41. The DBMS which runs on the machine 40 utilizes a code to represent characters and control function meanings. For this purpose, a code page maps all code points to the graphic characters and control function meanings utilized by the DBMS. The code page is represented by reference number 42. The DBMS is a language-based system, and in the example, it is assumed that the DBMS is an SQL-based system. Further, it is assumed that the version or level of the language is SQLAM3. This is denoted by reference numeral 46 in FIG. 1B.

A complete characterization of the personal computer environment which process user data 10 therefore must include an indication of the type of machine which processes the data, representation of machine-level information such as the data types which exist in the machine, and information showing in what form the data exists in the machine. In the example of FIG. 1A, the data types are integers, floating point numbers, and character strings. In the personal computer, integers are represented in low to high sequence, characters are in ASCII, and floating point is IEEE low to high. All of this information is represented in the invention by a machine-level representation descriptor. In FIG. 1B, the machine-level representation descriptor for the personal computer machine is indicated by reference numeral 44.

The context for conversion also requires information describing characteristics of the language in which the DBMS sending the information is written. In this description it is assumed that all of the DBMS sites are written in one or another version of an SQL-based language. In order to accommodate non-identical representations of control information produced by these varying versions, a system-level language characteristic descriptor must be available to the converting machine in order to convert the language-specific portions of the user data. In FIG. 1A, the language-specific portions are the communication areas. In order to provide this system-level information about the language characteristics, the converting machine is provided a system-level information unit descriptor. In FIG. 1B, the system-level descriptor for the personal computer language environment is indicated by reference numeral 45.

The context is completed by the provision of application level information specific to the user data being transferred. This information is given in the form of an application level user data descriptor. For the personal computer machine environment, this descriptor is indicated by reference numeral 47. The application level descriptor includes a control block for conveying information between cooperating DBMSs. This descriptor is in the form of a prefix appended to the user data which is sent to the receiver. This prefix contains information setting forth the machine and system-level characteristics of the transferred data. The system-level information provides a reference to the system-level information in the system-level descriptor corresponding to the language version of the serving system, as well as a reference to the machine-level information in the machine-level descriptor representing the serving machine. In FIG. 1B, reference numeral 47a represents the system-level reference made in the application level descriptor 47, while reference numeral 47b indicates the machine-level reference made in the descriptor. As FIG. 1B illustrates, reference is also made by the system-level descriptor to the machine-level descriptor. In FIG. 1B, the reference numeral 45a represents the machine-level reference made in the descriptor 45.

It should be evident that a user data context can be conveyed in whole each time user data is sent to a receiver by appending machine, system, and application level descriptors to the data. Appropriately, this would be employed in an asynchronous communication environment. In a synchronous communication environment, context could be completely conveyed by transfer of machine and system-level descriptors initially, followed by transmission of application level descriptors and binding of the received application level descriptors to the machine and system descriptors at the receiver's site. In either case, the machine and system-level descriptors would have to be transferred, in whole, at least once between the sites. This transfer is not required in this invention.

Thus, in FIG. 1B, assuming that the mainframe machine 50 is sending data, its machine-level and system-level descriptors 54 and 55 must be made available to the requesting personal computer machine 40 and linked to application level descriptors 57 in order to convert the user data of FIG. 1A from the representation 20 to the representation 10. Relatedly, the descriptors 54, 55 and 57 must be made available to the machine 40. Similarly, for data transferred in the opposite direction, that is, from the personal computer machine 40 to the mainframe machine 50, the descriptors 44, 45 and 47 would have to be made available to the mainframe machine 50 in order to convert user data 10 into the form of user data 20 in FIG. 1A.

In the practice of this invention, it is asserted that, during the implementation of each DBMS site which participates in a distributed, heterogeneous database system, a decision is made as to which specific machine representations will be supported at the site. It is asserted that the "native" representation of the machine on which the site's DBMS will run is supported. That is, if data from another DBMS identical to the receiving site's DBMS is received, the representation is "native" and requires no conversion. Additionally, other machine types will be supported as partners. Generally, the "non-native" representations of data types will be converted to "native" ones at the receiving site before processing. In the preferred embodiment, at each site, there is maintained a list of acceptable machine partner types at each site. Thus, at the site of the personal computer machine 40, a list of acceptable machine types includes the machine and code page corresponding to identifiers 51 and 52 in the machine 50. The list indexes to a set of descriptors which include the machine-level and system-level descriptors for all acceptable system partners. Thus, if the personal computer machine 40 receives simply identification of the machine and language present at the site 50, these identifications can be brought to the list which will index to the necessary descriptors in the list of descriptors, the indexed descriptors corresponding to the descriptors 54 and 55.

Therefore, when the personal computer 40 generates a request for data from the DBMS running on the machine 50, the receiver machine 40 sends its machine, codepage, and system-level name (PS/2, 437, SQLAM3) to the system to which connection is desired, in this case, the machine 50. If the machine 50 finds these names unacceptable (not in its list) then an error is returned to the receiver and the connection is broken. If the names are acceptable to the machine 50, the machine 50 assumes the status of server and completes connection by sending its machine and system-level names to the receiving machine 40. If these names are acceptable to the receiver, then the connection is established. Otherwise the connection is broken.

Having established the connection, the receiver sends a data request to the provider/server machine 50. The provider/server constructs a user data descriptor 57 according to the characteristics of the data requested, in this case according to the characteristics of user data 20 in FIG. 1A. In this case, the descriptor is built to reflect the presence of the SQL communication area 21 and the five user data fields 22, 23, 24, 25, and 26. The provider/server machine 50 then sends the descriptor 57 and the user data 20 to the receiver machine 40.

Upon receipt, the receiver uses the descriptors obtained in response to the machine and system-level identifier sent by the machine 50 and the references contained in the application level descriptor 57 to convert the user data 20 from the server's representations to the receiver's representations for subsequent processing.

It should be appreciated that the identifiers exchanged between the machine and the user data descriptor must be in a canonical form which is understood by both systems. In the preferred embodiment, this form is defined by a particular code page in EBCDIC. With this common basis for understanding, each site in the distributed system will recognize and correctly interpret the identifiers and user data descriptors of any other site.

Refer now to FIGS. 2A-2D for an understanding of the structure and contents of machine-level representation descriptors according to the invention. The descriptors for four machine types are illustrated. The descriptor 60 represents a machine exemplified by an IBM PS/2 executing a DBMS which uses code page 437 for character coding. The descriptor 70 characterizes a mainframe machine of the System/370 type whose DBMS uses code page 037. The descriptor 80 is for an AS/400 machine using code page 037. The descriptor 90 is for an hypothetical machine called OTHER using code page 850 for character encoding. The descriptors in these figures represent the machines in very simplified terms. The representations correspond to generic data types which are recognized and used by all database sites in a distributed system. In the figures, the data types are INTEGER for integer numbers, FLOAT for floating point numbers, and CHARACTER for non-numeric information, such as letters of an alphabet. Each generic data type is also described in terms of a format which is particular to the machine whose descriptor is illustrated.

The machine-level descriptors of FIGS. 2A-2D are shown as multi-field data objects, with the fields containing information relating to a generic data type or a data type format. Thus, detailed specifications of the INTEGER data type are contained in multi-field sections 62, 72, 82, and 92 of the machine-level descriptors. Detailed specifications of the representation of floating point numbers for these machines are contained in sections 64, 74, 84, and 94 of the descriptors. Character representations specifications are contained in sections 66, 76, 86, and 96 of the descriptors.

In the illustrated descriptors, each generic data type is identified initially by a marker definition (MD). For integers, the markers are in fields 67, 77, 87, and 97 of the descriptors. The markers for each generic type are identical in each machine descriptor set. They identify unambiguously the generic type of the representation which follows. Each MD is followed a type definition (TD). The type definition shows exactly, to the bit, how the data is represented in the machine identified by the descriptor. Taking integers as an example, the four TDs shown have three different bit representations. Two machines represent, in fields 88 and 78, that integers are binary values with the bytes ordered from high to low significance. One machine uses binary values, but reverses the order of the bytes, storing the low order byte first, as indicated in field 68 of the descriptor 60. The machine represented by the descriptor 90 represents integers in decimal digits in a packed format as indicated by field 98. The TDs shown are not all the same. However, the TDs which are the same mean exactly the same thing and are represented in exactly the same way among the descriptors. Thus, for example, integer high-to-low in fields 78 and 88 of descriptors 70 and 80 is exactly one representation.

In the invention, the MD-TD pairs can each represent a family of types. Integers of length 1, 2, 3, 4 ... bytes all can share the same descriptor. Similarly, for characters the actual code page to be associated with the type is a separate parameter. The code page specified in the TDs 69, 79, 89, 99 is a default which can be overridden. This is explained below with reference to FIGS. 3A and 3B.

The significance of a TD is not limited to association with a single generic data type. Thus, the same TD may be used as the representation for several different generic data types or MDs. For example, if there were a generic type called WEIGHT, it could be represented by floating point or integer numbers. It may be the case that different machines would support it differently. Such variation is supported fully by this invention. Thus, a generic data type is named specifically by the MD; how the data type is represented is specified by the TD.

One additional feature that will be evident to the ordinarily skilled practitioner is that the order of the generic type specifications (MD-TD pairs) is not important to the significance of the machine-level descriptors. The meaning set by the MD is used to establish linkage to an appropriate TD from a higher level descriptor, such as a system-level descriptor.

FIGS. 3A and 3B illustrate the structure and contents of system-level descriptors and how those descriptors are referenced to machine-level descriptors. In FIGS. 3A and 3B, the system-level descriptors illustrate two different levels of language support. In this regard, the descriptor 100 of FIG. 3A is for a level called SQLAM3 while the descriptor 120 of FIG. 3B is for a level called SQLAM4.

The system-level descriptor for an SQL information block which includes status of the SQL calls, the SQLCA, consists of markers (MDs), grouping descriptors (GDs), and row descriptors (RDs). Consider now the two system-level descriptors 100 and 120. In these descriptors, the first markers, 102 and 122, respectively, identify groups of fields which are to be included in the SQL communication area. These markers give generic meaning to the group of fields which follows, and are the same at all levels of DBMS implementation. In each descriptor, the group marker is identified as SQLCAGRP.

In the system-level descriptors, the group markers are followed by grouping descriptors (GD) 104 and 124, which indicate exactly which fields should be included in the SQL communication areas for user data.

A grouping descriptor has the property that members of its described group are ordered but not yet arrayed into a linear vector of fields.

Another property of grouping descriptors can be appreciated with reference to FIG. 3A where the grouping descriptor 104 includes machine-level references, in this case, Integer-4 and Character-80. These members of the indicated group are references to data types identified by marker definitions in machine-level descriptors. As FIG. 3A shows, these references provide reference directly to the integer and character MDs of the machine-level descriptor 60 (which is identical with the descriptor of FIG. 2A). The references are indicated by bindings 112 and 114. In the invention, the value specified in a reference is used to override the default length built into the machine descriptor. Thus, reference 114 in FIG. 3A overrides the machine length of its respective integer representation in the machine-level descriptor 60 to four bytes. In FIG. 3B, references 133 and 134 also override the machine length to four bytes for integers.

In FIG. 3B, the system-level descriptor 120 denotes one more field in the SQL communication area than the previous system-level descriptor 100 for SQLAM3. One more value therefore is returned to status in a CA of user data at this higher level. It is contemplated in the practice of the invention that, during connection processing, both the requesting and receiving DBMS tells the other what to expect. Preferably, the systems agree to operate at the same system descriptor level, and agree to the lower one.

The group description, 104 in FIG. 3A and 124 in FIG. 3B, is followed by another marker, 106 in FIG. 3A and 126 in FIG. 3B. These markers indicate that a row description for an SQL communication area is following. In each case, the row descriptor references the group described earlier, 110 in FIG. 3A and 130 in FIG. 3B. This vectorizes all of the fields and completes the definition of information which can be exchanged. In this row form, the SQL communication area can be exchanged on commands which do not involve user data, but which do involve system status information.

The row descriptors 108 and 128 are identical in both levels; they refer to groups which contain differing information (104 and 124), which, in turn, reference different machine descriptors 60 and 70. The row descriptors therefore make an actual block dependent on a language level or version, and make the block specific with regard to an identified machine, as well.

The system-level descriptor blocks illustrated in FIGS. 3A and 3B of either level can map onto any of the machine descriptors, independent of the order of the descriptors in the machine. The reference is to the MD entries in the machine descriptors. The generic type of field in the SQL communication area is linked to the representation of that generic type in the machine-level descriptor. As thus described, a system-level descriptor can provide a machine-independent way to specify the contents of blocks of information to be exchanged between DBMSs. They provide both group descriptions (which will be used by higher-level descriptors) and row descriptors which describe complete objects which may be exchanged. The row descriptors included in the system-level descriptor can be referenced by another row descriptor to produce an array. This is illustrated and discussed below with reference to FIG. 4. The system-level descriptors are established early in the implementation of a DBMS and assembled into a set. The set required for any level of implementation can be given a name which any other implementation will understand. In this regard, the name of the system-level descriptor 100 in FIG. 3A is "SQLAM3". In FIG. 3B, the name of the descriptor 120 is "SQLAM4". In the practice of the invention, it is these names alone which are exchanged when a communication connection is made, thereby obviating the need to exchange the descriptors themselves.

Refer now to FIGS. 4a and 4b for an understanding of the structure and content of a user data descriptor and how its linkages with machine- and system-level descriptors provide a complete context which enables a receiver DBMS to understand and convert user data from non-native to native form. The user data descriptor 200 provides a system-level and machine-level-independent way to describe user data. It is contemplated that this descriptor would not be built until run time, since, particulars of user data aren't known until after installation of a DBMS and creation and population of the relational tables in the DBMS, and until receipt of a particular request for data.

The user data descriptor 200, like the system- and machine-level descriptors discussed previously, consists of markers and other descriptors. A first marker MD 211 tags a group 212 consisting of an SQL communication area reference 213 to the system-level descriptor 100, and five references 213, 214, 215, 216, and 218 to the machine-level descriptor 70. These six references correspond to the six fields which make up a respective row of user data 20, which is reproduced for convenience in FIG. 4B. Thus, the group 212 identifies the fields within a row of the user data, field by field, tells what generic type of data is in each field, and specifies the size of the data. For example, the group 212 has a first reference SQLCAGRP-0 which indicates that the first field in a row of user data will consist of an SQL communication area. As shown in FIG. 4B, a communication area "CA" is in the first field 21 of each row of the user data 20. Similarly, the second field, field 22, in a user data row is a two-byte integer, the third field, field 23 is a three-byte character, the fourth field, field 24 is a two-byte integer, the fifth field, field 25 is a three-byte character, while the last field, field 26 is a four-byte floating point number.

The six references, 213, 214, 215, 216, and 220 result in a group with seven fields, two from the system-level descriptor (Integer-4 and Character-80) and five from the user data. All of these references are independent of a particular language level and a specific machine. It is true that the described data is very much dependent on these descriptive levels, but the key of this invention is that the description of the data is not.

Returning to the explanation of the user data descriptor 200 in FIG. 4A, the next MD marker 224 tags a RD row descriptor with a reference to the marker 211. This reference is used to define a row of elements in the row of user data. As explained above, such a row would include seven fields, the two fields of the SQL communication area followed by the five user data fields, in order. This completely enumerates the fields for one object which can be exchanged between heterogeneous DBMSs. It includes information in the communication area as to the status related to the request which fetched the data, along with the data. MD 224 is followed by an RD 232 with a modifier "1", which indicates that one copy of each element of the defined group should be included in the final row.

The final MD 228 tags an RD 234 with a reference 230 to the row descriptor 232. This descriptor is used to make an array or table of the set of rows comprising the user data 20 of FIG. 4B. The modifier "0" in the RD 234 indicates that the referenced row should be repeated as many times as necessary to include all the data which follows. This is of significant importance in queries since it is seldom possible to predict the final number of rows in an answer set before sending the first one (and the user data descriptor) to the receiver.

In summary, the user data descriptor provides a mode of describing data which is independent of the system-level and machine-level artifacts in the described data. The data described includes DBMS status information and the user data proper. The user data descriptor thus accommodates the definition of any data which a user can retrieve from (or send to) a DBMS. When the user data descriptor is bound to both a system-level descriptor and a machine-level descriptor, actual data can be understood in physical terms. Thus, the references (bindings) to the machine-level descriptor 70 and system-level descriptor 100 give physical meaning to the referencing members of the group 212. It is asserted that these references can be implemented conventionally by standard binding techniques.

Figure 5:
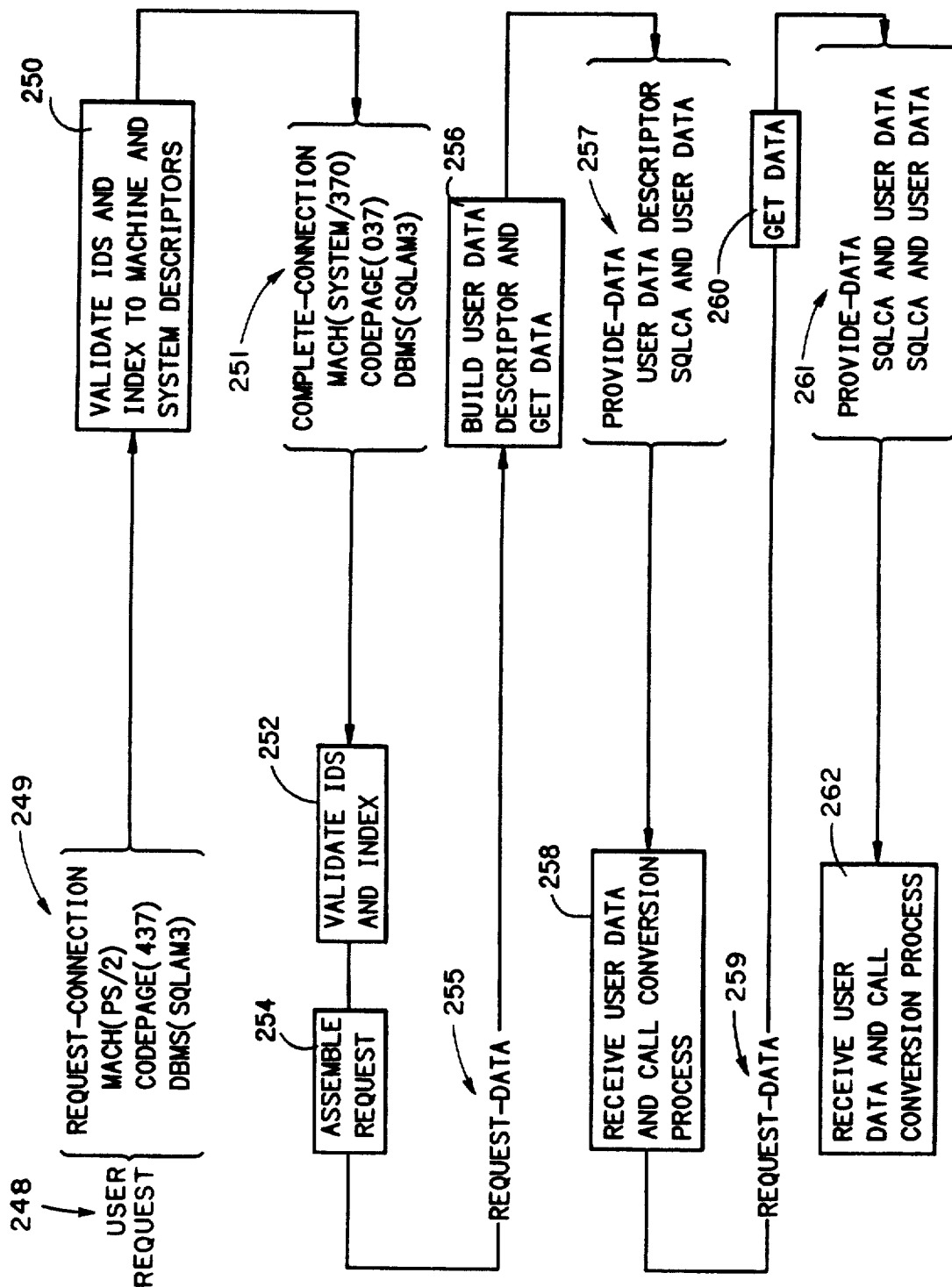
FIG. 5 illustrates the procedure of the invention in the example of command and data flows to set up a connection and transfer a set of user data.

FIG. 5 illustrates a procedure for establishing a conversion context using the data objects whose structures and functions have been described above. The procedure includes generic commands for requesting and completing a communication connection and for requesting and providing data. The procedure of FIG. 5 is illustrated as a simplified sequence which shows only the parameters which must, of necessity, be exchanged for transferring user data to a requesting from a sending machine and establishing translation contexts in the machines for conversion of the data. It is reiterated that the procedure of the invention is not for converting data, but rather for establishing all of the parameters necessary to enable the receiver to convert the data and establishing particular values for those parameters.

The structure of FIG. 5 places all of the requesting machine actions in the left-hand side of the drawing and all of the sending machine actions in the right-hand side. Thus, the requesting machine first receives a user request 248 for data which is maintained by a DBMS in the sending machine. Next, the requesting machine executes a REQUEST-CONNECTION command sequence 249 directed to the sending machine. The REQUEST-CONNECTION sequence includes parameters to identify the requesting machine, its character code, and its language level. In the example, the requesting machine is identified as a DBMS executing on a PS/2 personal computer, utilizing a specific code page (437) for character coding, and operating at a specific DBMS language level (SQLAM3). The parameters in the REQUEST-CONNECTION step are no more than identifiers. Next, in step 250 the sending machine receives the connection request, validates the machine- and system-level identifiers, and uses these identifications to index to machine-and system-level descriptors. Assuming that the sending machine recognizes and possesses the machine- and system-level descriptors identified in the connection request, it executes a COMPLETE-CONNECTION step 251 including parameters which provide machine- and system-level identification to the requesting machine. In step 252, the COMPLETE-CONNECTION response received from the sending machine is validated in the requesting machine and the identifiers are used to index the appropriate the machine- and system-level descriptors. For example, in the example of FIG. 5, the requesting machine would index to the machine and system descriptors 70 and 100 illustrated in FIG. 2B, 3B, and 4A. Next, in step 254, the requesting machine assembles a data request and sends it as a REQUEST-DATA command 255 to the sending machine. In step 256, the sending machine responds to the REQUEST-DATA command by obtaining the requested data and building a user-data descriptor such as the descriptor 200 illustrated in FIG. 4A, and executes a PROVIDE-DATA command 257 by sending the user-data descriptor and the user data as, for example, the first row in the user data 20 in FIGS. 1B and 4B. The requesting machine then, in step 258, receives the transmitted descriptor and user data and calls a conversion process to convert the data. According to the needs of a particular implementation, the bindings between the user data descriptor and the indexed machine and system descriptors can be done in step 258 or left for the called conversion process. In FIG. 5 a second REQUEST-DATA command 259 is sent, and its parameters are processed, with the server, in step 260, obtaining the data. The remaining user data is returned with another PROVIDE-DATA command 261 having as its parameters the user data. The requesting machine again processes the data 262 according to the user data descriptor received in step 258 and to the system level, machine type, and code page values received during the connection portion of the process. Now if the receiver requires more data, it issues another REQUEST-DATA command, with the server returning the data with another PROVIDE-DATA command, and so on.

Figure 6:
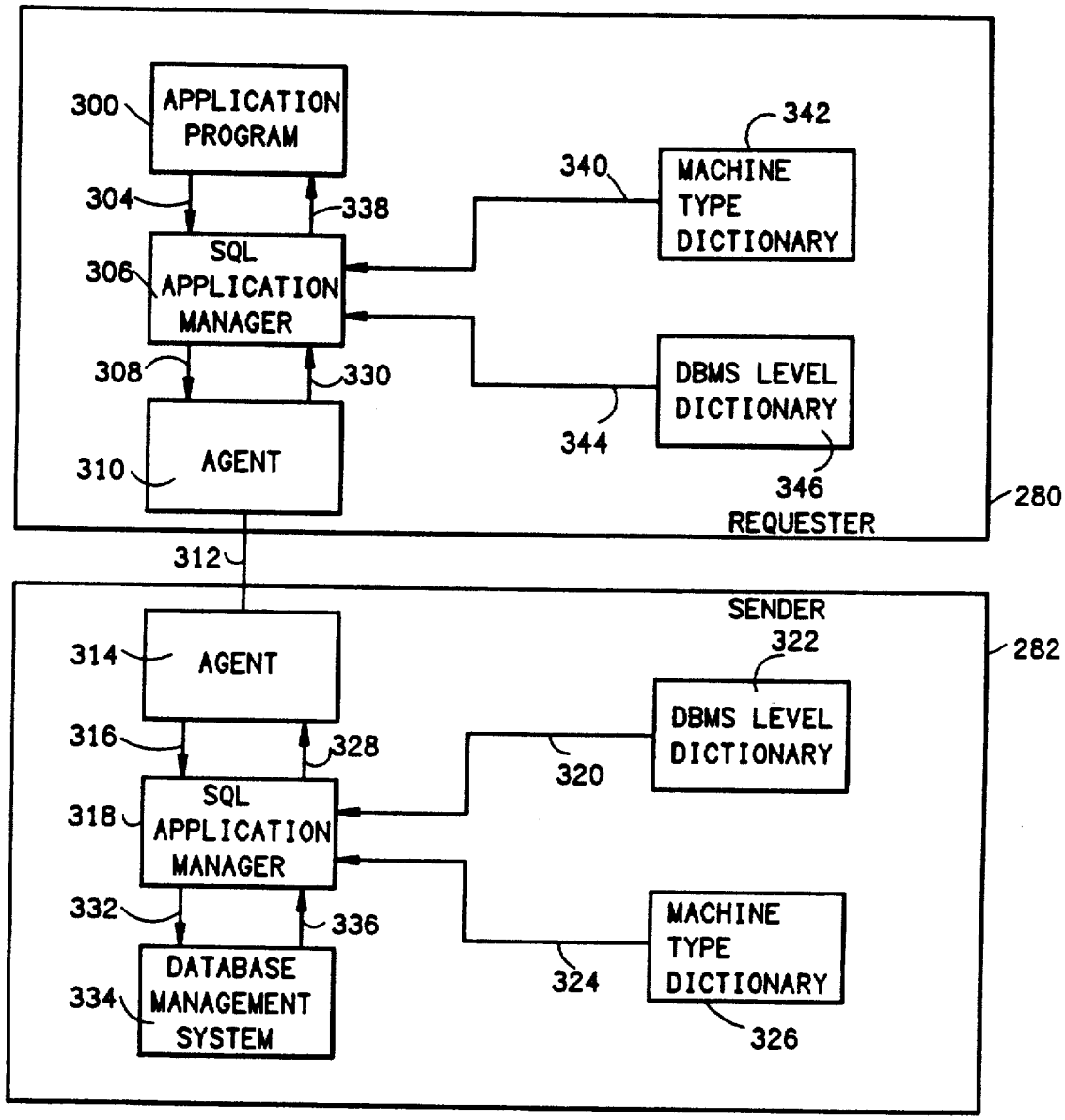
FIG. 6 illustrates a representative system architecture on which the invention may be practiced.

An architecture for implementing the procedure of FIG. 5 is illustrated in FIG. 6. In FIG. 6, the requesting machine is assumed to be, as set out above, a PS/2 personal computer, while the server is assumed to be a mainframe of a System/370 type. The receiver is identified by reference numeral 280, the server by 282. It is asserted that the receiver 280 is conventionally structured with a CPU, storage, a communications adapter for communicating with the sending machine 282, and a user interface for receiving commands from and providing responses to a user. In the storage resides an application program 300, a relational DBMS of the SQL type which includes an SQL application manager 306 and a communications agent 310. In addition, two dictionaries, 342 and 346, are stored which include machine descriptors (dictionary 342) and system-level descriptors (dictionary 346).

The sending machine 282 can comprise a conventionally-programmed System/370 mainframe computer with an SQL-type DBMS 334. An SQL application manager 318 interfaces a communication agent 314 with the DBMS 334. Two dictionaries 322 and 326 are provided for storing system-level descriptors (dictionary 322) and machine-level descriptors (dictionary 326).

The process of FIG. 5 is initiated when the application program 300 issues a database management request. For example, the request can be an SQL statement OPEN. This request results in a call 304 to the application manager 306. The receiver's application manager 306 first has to establish a connection with the desired database management system. This is accomplished by constructing a REQUEST-CONNECTION command in accordance with FIG. 5, with parameter values which describe itself (machine and code page designations) and the level of DBMS services desired (in this case, SQLAM3), as well as parameters (not shown) which identify the sending DBMS. This command is passed at 308 to the communications agent 310 which is responsible for establishing the communication link with the identified sending machine. The REQUEST-CONNECTION command is sent over a conventional communications link 312 to the communications agent 314 responsible for the other end of the communication channel. The agent 314 examines the DBMS parameter (FIG. 5) to determine which level of server SQL application manager to invoke. Once the determination and invocation is completed, the agent 314 forwards at 316 the request to the invoked SQL application manager 318. The manager 318 accesses at 320 the DBMS level dictionary 322 to obtain a descriptor which matches the receiver's desired level of function. (In the preferred implementation, the content of this descriptor is known early in the development cycle and for processing efficiency is "built into" the application manager 318.) Similarly, the manager 318 accesses at 324 the identified machine level descriptor from the dictionary 326. This includes descriptors matching the machine designated in the MACH parameter of the REQUEST-CONNECTION command and a code page identified in the CODE PAGE parameter.

Having verified that the receiver's environment can be handled, the application manager 318 constructs a COMPLETE-CONNECTION command as illustrated in FIG. 5. The command states the sending machine's characteristics in the MACH code page parameters and the level of system function which the sending machine will support in the DBMS parameter. It is contemplated in the invention that the connection steps may repeat in order to support negotiation to a different system level than that originally requested. Next, the COMPLETE-CONNECTION response is returned to the requesting machine 280 by sending it on 328 to the agent 314 which communicates it on the communication link 312 to the receiver agent 310. The receiver agent 310 sends the COMPLETE-CONNECTION command and parameters at 330 to the application manager 306. In a manner similar to the manager 318, the manager 306 accesses the system and machine-level descriptors which describe the server machine and system characteristics from the dictionaries 342 and 346. Having validated that connection has been established, and having obtained the machine- and system-level descriptors at both ends of the connection, processing continues. The receiver's application manager 306 constructs a REQUEST-DATA command corresponding to the OPEN request from the application program 300. This command is sent to the server's application manager 318 via 308, 310, 312, 314 and 316. The application manager 318 recognizes a "first request" and issues an OPEN command 332 to the local DBMS 334, which returns the status in the form of an SQL communication area 336. Next, the manager 318 issues a request on 332 to determine the format of the answer set. The format of the answer set is returned on 336 to the server application manager 318 which constructs the user data descriptor for the data. Assuming that data is buffered into the manager 318 and that there is room in the buffer, the server's application manager 318 issues an SQL FETCH request on 332 to the DBMS 334 which returns a first row of data on 336. (It is assumed that the data to be returned corresponds to the user data 20 in FIGS. 1A and 4B.) Next, the server application manager 318 places the data in a reply buffer and issues a PROVIDE-DATA command to send the data to the receiver's application manager 306 via 328, 314, 312, 310, and 330. It is contemplated, but not required, that the server's application manager 318 may read ahead to fill buffers in anticipation of the next REQUEST-DATA command.

Upon receiving data with the first PROVIDE-DATA command, the receiver's application manager 306 processes the user data descriptor to verify correctness and to prepare to convert data subsequently received. Assuming no errors are found, the application manager 306 then sends the result of the OPEN back to the application program 300 on 338. From now on, the receiver's application manager 306 may, but is not required to, read ahead requesting additional buffers from the server's application manager 318 in anticipation of FETCH requests.

Having successfully opened a Cursor, the application program 300 issues an SQL FETCH which is processed by the receiver's application manager 306. At this time, the receiver's application manager 306 has a row of data to return, and converts the data and returns it on 338 to the application program 300. The application 300 processes the data and SQL communication area received and subsequently issues another FETCH command on 304 to obtain another row of data. The receiver's application manager 306 having no data to satisfy this request sends another REQUEST-DATA command to the server's application manager 318 via 308, 310, 312, 314, and 316. The server's application manager 318 having read ahead, has a buffer containing the last two rows of data. These rows are sent with the PROVIDE-DATA command to the receiver's application manager 306 via 328, 314, 312, 310, and 330. The application manager 306 then converts the first row of the buffer using the previously constructed conversion descriptors and passes it on 338 to the application 300.

To complete the example, the application 300 issues another SQL FETCH request on 304 to request the last row of the answer set. The receiver's application manager 306 converts this last row of data and returns it to the application.

In this example, end-of-query is understood by the application by content of the result achieved. Additional FETCH requests would be required as would an SQL communication area indicating end-of-query, which would have been constructed to allow the DBMS 334 to signal this condition to the application. However, this is beyond the scope of this invention and is not discussed.

A data converter is not illustrated as an element in any of the figures, it being understood, that data format conversion is well-known in the art. For example, U.S. Pat. No. 4,559,614 of Peek et al., assigned to the Assignee of this application, describes in detail how conversion from a first to a second internal code format is accomplished for data transmitted between two dissimilar computer systems. To the extent necessary, this patent is incorporated herein by reference.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. In a multi-database combination including a first database system and a second database system, each having different machine environments and data formats, a method for describing machine environments and format of data to be exchanged between the first and second database systems, the method including the sequential steps of:

establishing a communication link between the first and second database systems;

on the communication link, communicating from the first database system to a second database system a description of the machine environment of the first database system and communicating from the second database system to the first database system description of the machine environment of the second database system;

sending at least two database access requests from the first database system to the second database without resending the descriptions of machine environment;

in response to a first of the at least two database access requests, returning from the second database to the first database system user data in a data format native to the second database system and descriptions of the data format without sending the descriptions of the machine environment of the second database system; and in response to each database access request following the first database access request, returning from the second database system to the first database system user data in the data format native to the second database system without sending descriptions of the machine environment or the data format; and whereby, user data in the format native to the second database system is converted by the first database system into a format native to the first database system using the descriptions of the format and the descriptions of the machine environment of the second database system.

2. The method of claim 1 further including the step of converting the user data into a format native to the first database system at the first database system in response to the descriptions of the data format native to the second database system and the description of the machine environment of the second database system.

* * * * *